(12) United States Patent
Thomas et al.

(10) Patent No.: US 8,876,043 B2
(45) Date of Patent: Nov. 4, 2014

(54) AIRCRAFT ENGINE EXHAUST NOZZLE SYSTEM FOR JET NOISE REDUCTION

(75) Inventors: Russell H. Thomas, Yorktown, VA (US); Michael J. Czech, Issaquah, WA (US); Ronen Elkoby, Los Angeles, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/214,469

(22) Filed: Aug. 22, 2011

(65) Prior Publication Data

US 2012/0061510 A1    Mar. 15, 2012

Related U.S. Application Data

(60) Provisional application No. 61/375,386, filed on Aug. 20, 2010.

(51) Int. Cl.
*B64D 33/04*    (2006.01)
*B64D 27/26*    (2006.01)
*B64D 27/00*    (2006.01)
*F02K 1/34*    (2006.01)

(52) U.S. Cl.
CPC ..................................... *B64D 33/06* (2013.01)
USPC ............................................. 244/54; 244/1 N

(58) Field of Classification Search
USPC ....... 244/1 N, 199.1, 200.1, 204, 204.1, 53 R, 244/54, 55
See application file for complete search history.

(56) References Cited

U.S. PATENT DOCUMENTS

| | | | | |
|---|---|---|---|---|
| 6,820,410 | B2 * | 11/2004 | Lair | 244/1 N |
| 6,969,028 | B2 * | 11/2005 | Dun | 244/54 |
| 2008/0272228 | A1 * | 11/2008 | Mengle et al. | 244/54 |
| 2010/0257865 | A1 | 10/2010 | Mengle | |
| 2011/0155862 | A1 | 6/2011 | Mengle | |

OTHER PUBLICATIONS

Steven J. Massey, Alaa A. Elmiligui, Craig A. Hunter, Russell H. Thomas, S. Paul Pao, and Vinod G. Mengle, "Computational Analysis of a Chevron Nozzle Uniquely Tailored for Propulsion Airframe Aeroacoustics," 12th AIAA/CEAS Aeroacuostics Conference (27th AIAA Aeroacoustics Conference) May 8-10, 2006, Cambridge, Massachusetts.

Craig A. Hunter, Russell H. Thomas, K.S. Abdol-Hamid, S. Paul Pao, Alaa A. Elmligui, and Steven J. Massey, "Computational Analysis of the Flow and Acoustic Effects of Jet-Pylon Interaction," 11th AIAA/CEAS Aeroacoustics Conference May 23-25, 2005, Monterey, California.

\* cited by examiner

*Primary Examiner* — Tien Dinh
*Assistant Examiner* — Richard R Green
(74) *Attorney, Agent, or Firm* — Robin W. Edwards; Helen M. Galus

(57) ABSTRACT

The aircraft exhaust engine nozzle system includes a fan nozzle to receive a fan flow from a fan disposed adjacent to an engine disposed above an airframe surface of the aircraft, a core nozzle disposed within the fan nozzle and receiving an engine core flow, and a pylon structure connected to the core nozzle and structurally attached with the airframe surface to secure the engine to the aircraft.

20 Claims, 5 Drawing Sheets

AIRCRAFT ENGINE EXHAUST NOZZLE SYSTEM FOR JET NOISE REDUCTION

CROSS-REFERENCE TO RELATED APPLICATIONS

This application claims the benefit of priority under 35 U.S.C. §119 of U.S. Provisional Patent Application No. 61/375,386, with a filing date of Aug. 20, 2010, the contents of which are incorporated by reference in their entirety. In addition, this application is co-pending with related patent applications entitled "ACTIVE AIRCRAFT PYLON NOISE CONTROL SYSTEM" having U.S. patent application Ser. No. 13/214,481 and "BLENDED CUTOUT FLAP FOR REDUCTION OF JET-FLAP INTERACTION NOISE" having U.S. patent application Ser. No. 13/214,453 filed on the same day and owned by the same assignee as this patent application.

ORIGIN OF THE INVENTION

The present invention was made in part by an employee of the United States Government and may be manufactured and used by or for the Government of the United States of America for governmental purposes without the payment of any royalties thereon or therefore.

BACKGROUND OF THE INVENTION

The present invention relates to an aircraft engine exhaust nozzle system, and more specifically, to an aircraft engine exhaust nozzle system reducing jet noise by acoustic shielding.

Conventional aircraft typically include propulsion engines, which are under the wing or tail surfaces. FIG. 1 illustrates an aircraft including a conventional engine exhaust nozzle system. As shown in FIG. 1, the aircraft 100 includes a fuselage 101, wings 102, and a propulsion engine system 103. The propulsion engine system 103 is attached underneath the wing 102 by a pylon structure 107. Each propulsion engine system 103 includes an engine 106 housed in a nacelle 104 and having an inlet 105 and a nozzle system 150. The nozzle system 150 releases a jet exhaust from the engine into the atmosphere. Primary component noise sources from the engine system 103 include the noise associated with each of the fan, compressor, turbine, combustor, and that noise associated with the high velocity jet exhaust flow. There are many methods for reducing the various noise sources from the aircraft 100 including those noise sources from the engine system 103. One method that has the potential of significant noise reduction includes the use of the aircraft itself as an acoustic shield for the noise sources associated with the engines 106. This approach requires a new configuration of aircraft with the engines installed on the upper surface of the wing 102, fuselage 101, or an aircraft that has a hybrid wing and fuselage. Of the engine noise sources, the jet exhaust noise source is a particular challenge due to the fact that the noise sources are in the exhaust flow itself and therefore originate throughout the jet exhaust flow as many as ten engine diameters downstream of the nozzle system 150 exit plane.

Therefore, it is desirable to have an improved aircraft nozzle system that is capable of much more noise reduction when installed on the upper surface of the aircraft.

SUMMARY OF THE INVENTION

The present invention accomplishes the above stated objective by providing an aircraft engine exhaust system, which simultaneously can reduce noise through three approaches. The invention can reduce low frequency jet noise, a source which is more difficult to shield by the aircraft. The invention can redistribute upstream toward the nozzle the peak noise sources over a broad frequency range so that they can be more effectively shielded by the aircraft. Furthermore, depending on the embodiment, the invention can redistribute jet noise sources in the azimuthal direction so that peak direction of propagation is away from the region of interest.

According to one embodiment of the present invention, an aircraft exhaust engine nozzle system is provided. The aircraft exhaust engine nozzle system includes a fan nozzle configured to receive a fan flow from a fan disposed adjacent to an engine disposed above an airframe surface of the aircraft, a core nozzle disposed within the fan nozzle and configured to receive an engine core flow, and a pylon structure connected to the core nozzle and structurally attached with the airframe surface to secure the engine to the aircraft.

According to another embodiment of the present invention, an aircraft system includes a fuselage, a wing carried by the fuselage, an engine formed above the wing; and the above-mentioned engine exhaust nozzle system formed around the engine.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter, which is regarded as the invention, is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION OF THE INVENTION

The present invention is an engine exhaust nozzle system for an aircraft. Several embodiments of the present invention include the nozzle system as being a separate flow, round or chevron-formed nozzle system installed above the wing, tail surfaces, or fuselage of the aircraft or within a hybrid wing body aircraft where the engine is installed above the wing. Embodiments of the present invention further include the use of pylon technology to increase the effectiveness of acoustic shielding in the aircraft and modifying the orientation of the nozzle system and the pylon technology to even further increase the effectiveness of acoustic shielding.

Figure 1:
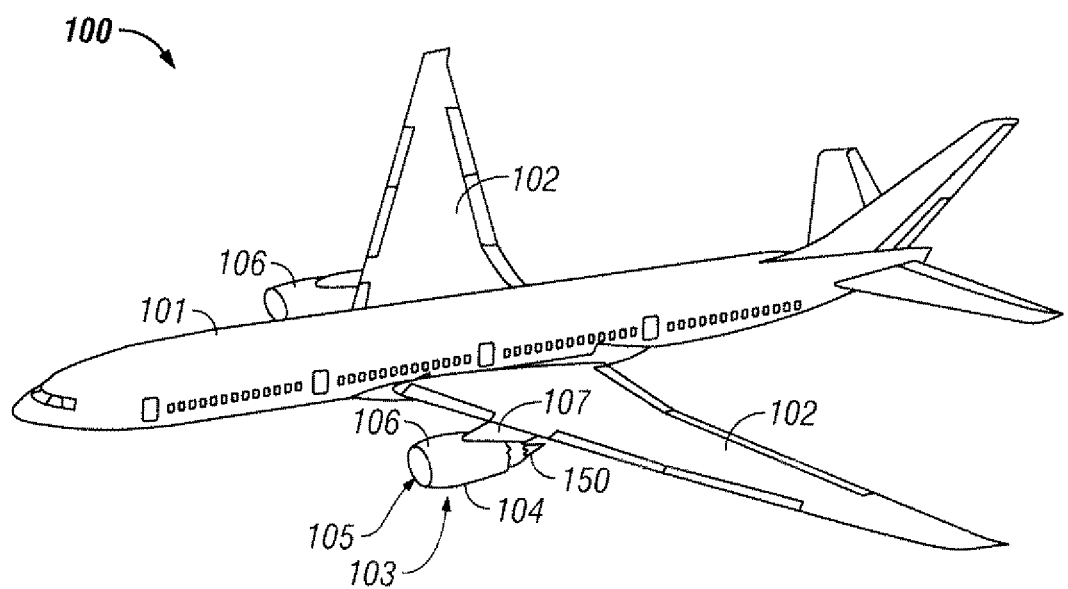
FIG. 1 illustrates an aircraft including a conventional engine exhaust nozzle system.
Figure 2:
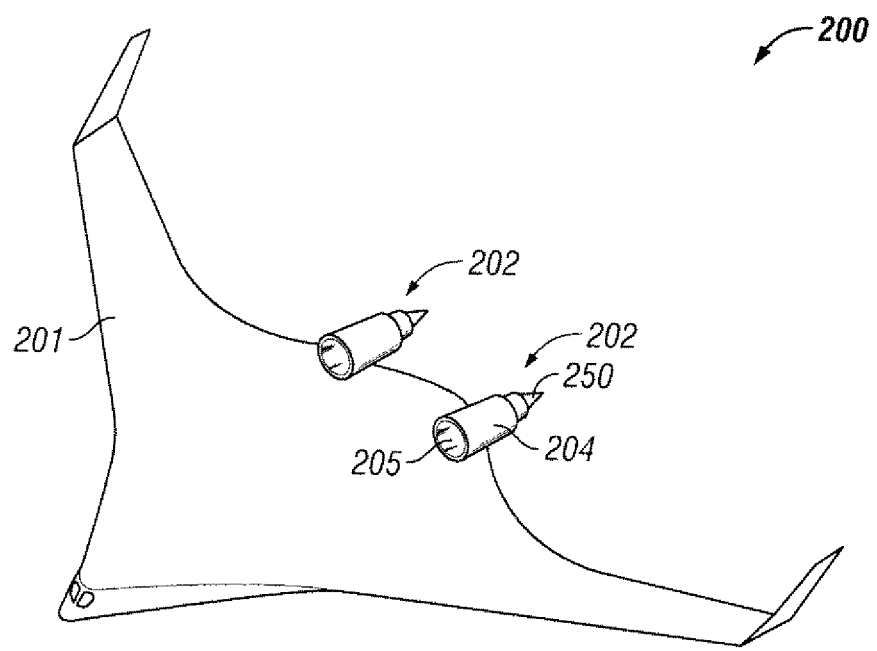
FIG. 2 illustrates an aircraft including an engine exhaust nozzle system installed above an aircraft wing that can be implemented within embodiments of the present invention.

FIG. 2 illustrates an aircraft including an engine exhaust nozzle system installed above an aircraft wing that can be implemented within embodiments of the present invention. As shown in FIG. 2, a hybrid wing-body aircraft 200 is provided. The aircraft 200 includes a hybrid wing-body 201 and a plurality of engines 202. Each engine 202 is housed in a nacelle 204 and includes an inlet 205 and a nozzle system 250. The present invention is not limited to a particular number of engines 202 and may vary accordingly. In addition, the nozzle system 250 may be formed in any manner necessary to implement the purpose set forth herein. Additional details regarding the nozzle system 250 will now be discussed below with reference to FIGS. 3 through 6.

Figure 3:
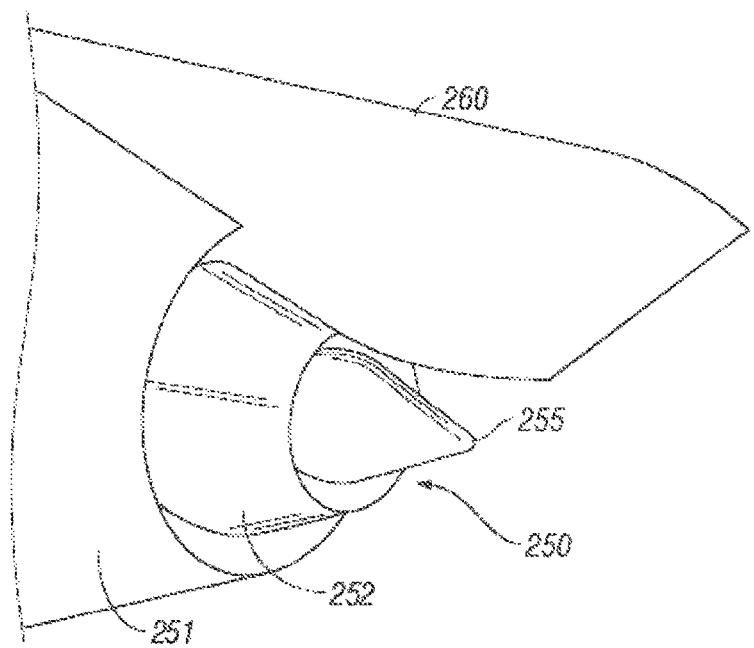
FIG. 3 is a partial schematic of an engine exhaust nozzle system that can be implemented within embodiments of the present invention.

FIG. 3 is a partial schematic of an engine exhaust nozzle system that can be implemented within embodiments of the present invention. As shown in FIG. 3, the nozzle system 250 includes a fan nozzle 251, which directs fan flow away from an upstream engine along a predetermined path. The nozzle system 250 further includes a core nozzle 252 that directs core flow away from the engine 202 (as depicted in FIG. 2). The nozzle system 250 further includes a plug 255 at a center of the core nozzle 252. According to an embodiment of the present invention, the nozzle system 250 further includes a pylon structure 260 formed at an upper surface (i.e., a crown portion) of the fan nozzle 251 opposite an airframe surface (e.g., the wing body portion 201). The pylon structure 260 further controls and direct exhaust airflow in an upstream direction away from the nozzle system 250 as discussed below with reference to FIG. 4.

Figure 4:
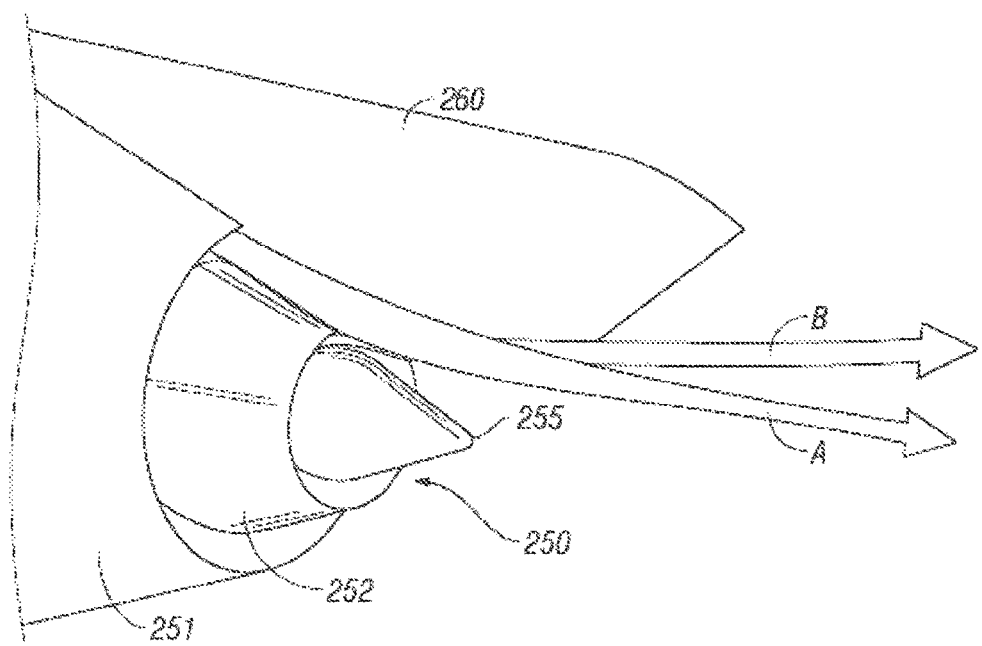
FIG. 4 is partial schematic illustrating the effect on engine exhaust flow of the pylon structure included in the engine exhaust nozzle system shown in FIG. 3 that can be implemented within embodiments of the present invention.

FIG. 4 is partial schematic illustrating the effect on engine exhaust flow of the pylon structure included in the engine exhaust nozzle system shown in FIG. 3 that can be implemented within embodiments of the present invention. As indicated by the arrows A and B shown in FIG. 4, the fan flow (as indicated by Arrow A) and the core flow (as indicated by Arrow B) travel in an downstream direction away from the nozzle system 250. The aerodynamic shape of the pylon structure 260 alters what would otherwise be an axisymmetric and concentric jet exhaust flow. Because of the curvature of the pylon shelf (as shown in FIG. 3) combined with the wake of the pylon structure 260, the flow of core nozzle 252 has a tendency to move off of the centerline of the nozzle system 250 and into the wake of the pylon structure 260. The effect of this subtle relative movement between the flows of the fan nozzle 251 and the core nozzle 252 can be to redistribute jet noise sources in the azimuthal direction and, to some extent in the axial direction as well. Embodiments of the present invention further include a plurality of pylon structures to increase the effectiveness of acoustic shielding of the aircraft 200. Additional details will now be discussed with reference to FIGS. 5 and 6.

Figure 5:
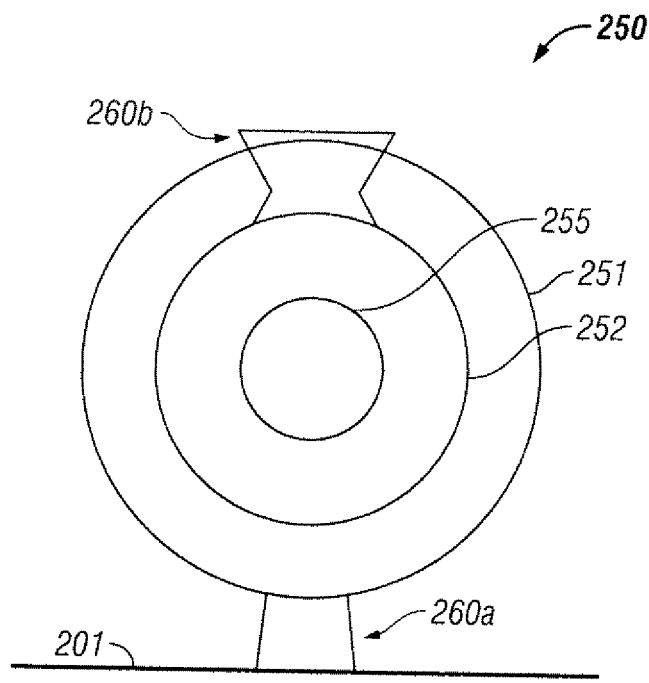
FIG. 5 is a partial schematic of an engine exhaust nozzle system having a plurality of pylon structures that can be implemented within other embodiments of the present invention.

FIG. 5 is a partial schematic of an engine exhaust nozzle system having a plurality of pylon structures that can be implemented within other embodiments of the present invention. As shown in FIG. 5, the nozzle system includes a plurality of pylon structures 260a and 260b. The first pylon structure 260a is connected to the core nozzle 252, and structurally attached with the airframe surface 201, at a keel position, to secure the engine 202 to the aircraft 200. The first pylon structure 260a aerodynamically closes out before an exit plane of the fan nozzle 251, ideally, but could also be closed out before the exit of the core nozzle 252. A second pylon structure 260b is formed at an upper surface (i.e., a crown position) of the fan nozzle 251 opposite the first pylon structure 260a formed at the airframe surface 201 (e.g., in a keel position). The second pylon structure 260b extends downstream longer than the core nozzle exit and similar to the pylon 260 of FIG. 3. According to an embodiment of the present invention, the first pylon structure 260a and the second pylon structure 260b are formed at approximately 180 degrees apart however the present invention is not limited hereto and may vary as needed. That is, the first pylon structure 260a and the second pylon structure 260b may be oriented at a different angle other than 180 degrees. This orientation is made to take advantage of the strong azimuthal directivity created by the second pylon structure 260b to better orient peak noise away from directions of interest (people on the ground, for example). According to an embodiment of the present invention, the first pylon structure 260a may be fixed since it structurally attaches the engine 202 to the airframe surface and the second pylon structure 260b may be oriented at an orientation other than 180 degrees from the first pylon structure 260a. The present invention is not limited to any particular type of pylon structure in the keel position and may be implemented within any type of pylon structure. A pylon structure in the keel position according to another embodiment of the present invention will now be discussed below with reference to FIG. 6.

Figure 6:
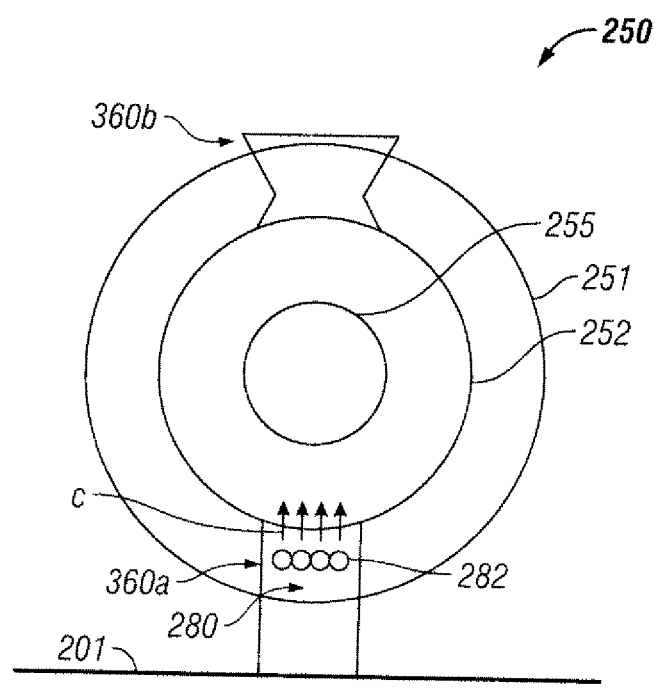
FIG. 6 is a partial schematic of the engine exhaust nozzle system shown in FIG. 5 including an additional pylon structure having a perforated surface that can be implemented within embodiments of the present invention.

FIG. 6 is a partial schematic of the engine exhaust nozzle system shown in FIG. 5 including a pylon structure having a perforated surface that can be implemented within other embodiments of the present invention.

Figure 7:
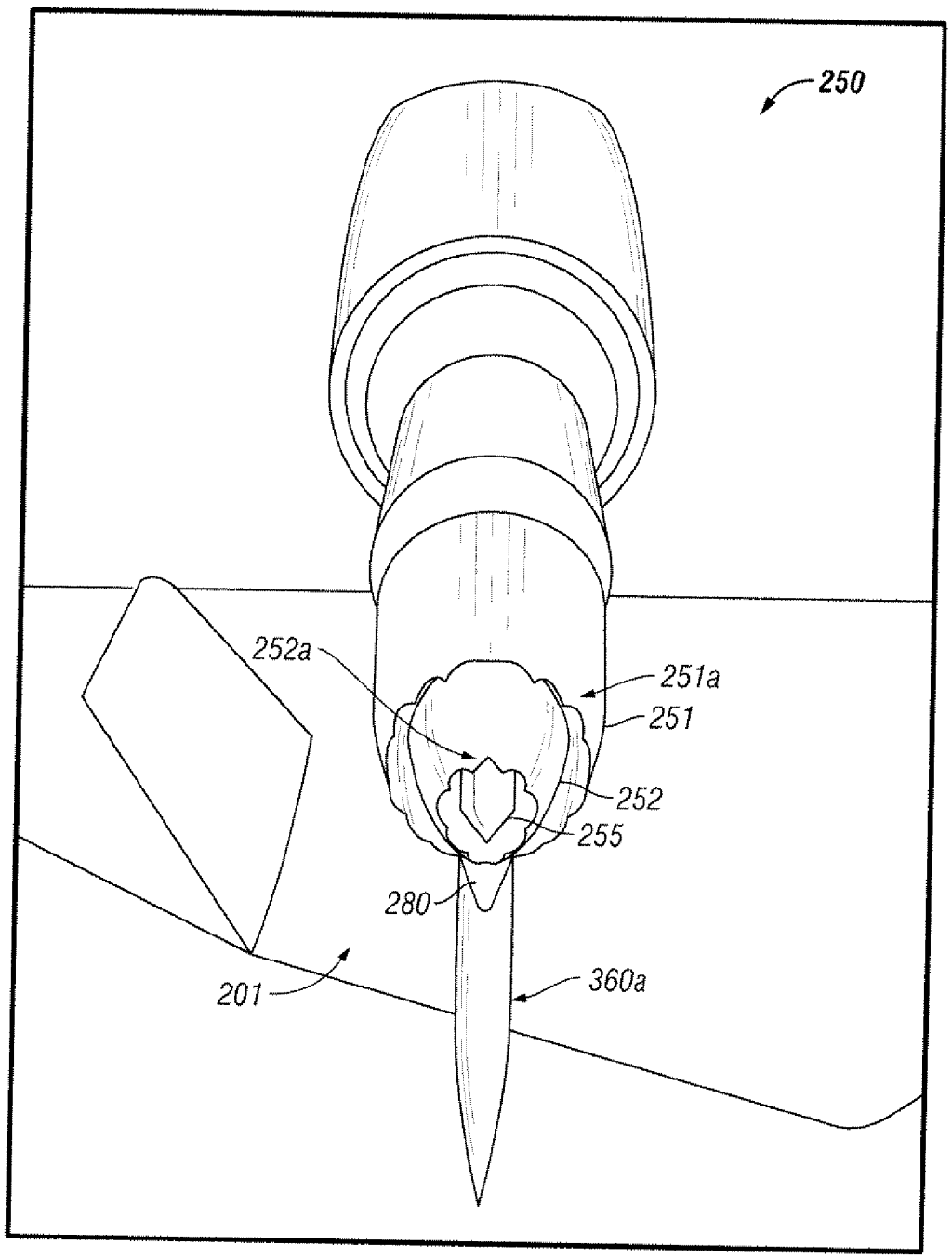
FIG. 7 is a partial schematic of an engine exhaust nozzle system having a chevron-formed nozzles that can be implemented within other embodiments of the present invention.

As shown in FIG. 6, the nozzle system 250 further includes a pylon structure 360a integrally formed with a lower surface of the core nozzle 252. The pylon structure 360a is longer than the pylon structure 260a shown in FIG. 5. The pylon structure 360a extends downstream of the exits for the fan and core nozzles 251 and 252 (as depicted in FIG. 7). A pylon structure 360b is also provided and is the same as pylon structure 260b shown in FIG. 5 thus a description thereof is being omitted. According to an embodiment of the present invention, the pylon structure 360a may include a perforated surface 280 having a plurality of apertures 282 formed to flow air, for example, therethrough (as indicated by arrows C) as described in the copending commonly assigned application entitled "Active Pylon Noise Control System" having Ser. No. 13/214,481 filed on Aug. 20, 2011 and incorporated by reference herein in its entirety.

The present invention is not limited to the fan nozzle 251 and the core nozzle 252 being formed in a round design. These nozzles 251 and 252 may be formed with an exit perimeter thereof having projections formed thereon. Additional details regarding this embodiment will be discussed below with reference to FIG. 7.

FIG. 7 is a partial schematic of an engine exhaust nozzle system having chevron-formed nozzles that can be implemented within other embodiments of the present invention. As shown in FIG. 7, the fan nozzle 251 and/or the core nozzle 252 may be formed with a plurality of projections 251a and 252a formed at an exit perimeter thereof and extending in an aft direction. The projections 251a and 252a are spaced apart from each other by a predetermined gap as shown. According to one embodiment of the present invention, the plurality of projections 251a and 251a may be circumferentially formed, uniform in size, along the exit perimeter of the fan nozzle 251 and/or the core nozzle 252. The uniform, in size, projections may be either uniform or varying, circumferentially, in immersion into the flow. According to yet another embodiment of the present invention, the plurality of projections 251a and 252a may be azimuthally varied in size as shown in FIG. 7.

According to yet another embodiment of the present invention, as further shown in FIG. 7, a number of the projections 251a and 252a on a side of the fan nozzle 251 and the core nozzle 252, adjacent to the pylon structure 360a are greater in size than a remainder of the plurality of the projections 251a and 252a.

Embodiments of the present invention provide an aircraft engine exhaust nozzle system capable of redistributing engine noise sources upstream where they can be shielded by a surface of the aircraft. Therefore, the present invention provides the advantage of further reducing noise associated with the engine exhaust by increasing the effectiveness of acoustic shielding by the aircraft. Embodiments of the present invention, further implement an aircraft pylon technology and a method for varying of an orientation of the nozzles of the aircraft nozzle system, and the pylon structures in a crown position and a keel position relative to the airframe surface of the aircraft, to further increase shielding effectiveness.

The present invention is not limited to being used in an aircraft. It may be applied to other industries, for example, a high pressure exhaust duct from a factory, machinery, or other applications to thereby reduce associated noise.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. It is therefore to be understood that, within the scope of the appended claims, the invention may be practiced other than as specifically described.

What is claimed as new and desired to be secured by Letters Patent of the United States is:

1. An engine exhaust nozzle system for an aircraft comprising:
   a fan nozzle configured to receive a fan flow from a fan disposed adjacent to an engine disposed above an airframe surface of the aircraft;
   a core nozzle disposed within the fan nozzle and configured to receive an engine core flow;
   a first pylon structure connected to the core nozzle and structurally attached with the airframe surface to secure the engine to the aircraft; and
   a second pylon structure formed at an upper surface of the fan nozzle opposite the first pylon structure formed at the airframe surface, wherein the second pylon structure extends downstream of exits for the fan nozzle and the core nozzle.

2. The engine exhaust nozzle system of claim 1, wherein at least one of the fan nozzle and the core nozzle further comprises a plurality of projections formed at an exit perimeter thereof and extending in an aft direction, the projections being spaced apart from each other by a predetermined gap.

3. The engine exhaust nozzle system of claim 2, wherein the plurality of projections are circumferentially formed.

4. The engine exhaust nozzle system of claim 2, wherein the plurality of projections are azimuthally varying projections.

5. The engine exhaust nozzle system of claim 4, wherein a number of the projections on a side of the at least one of the fan nozzle and the core nozzle, adjacent to the first pylon structure are greater in size than a remainder of the plurality of the projections of the at least one of the fan nozzle and the core nozzle.

6. The engine exhaust nozzle system of claim 1, wherein the first pylon structure and the second pylon structure are formed at approximately 180 degrees apart.

7. The engine exhaust nozzle system of claim 1, wherein the airframe surface comprises at least one of a wing, a tail, a fuselage and a hybrid body-wing configuration of the aircraft.

8. The engine exhaust nozzle system of claim 1, wherein the first pylon structure is integrally formed with a lower surface of the core nozzle and extends downstream of exits for the fan nozzle and the core nozzle.

9. The engine exhaust nozzle system of claim 8, wherein the first pylon structure comprises a perforated surface including a plurality of apertures formed to flow air therethrough.

10. The engine exhaust nozzle system of claim 1, wherein the first pylon structure is integrally formed with a lower surface of the core nozzle and closes out before the exit of the core nozzle.

11. An aircraft system comprising:
    a fuselage;
    a wing carried by the fuselage;
    an engine formed above the wing; and
    an engine exhaust nozzle system formed around the engine, and comprising:
       a fan nozzle configured to receive a fan flow from a fan disposed adjacent to an engine disposed above an airframe surface of the aircraft;
       a core nozzle disposed within the fan nozzle and configured to receive an engine core flow;
       a first pylon structure connected to the core nozzle and structurally attached with the airframe surface to secure the engine to the aircraft; and
       a second pylon structure formed at an upper surface of the fan nozzle opposite the first pylon structure formed at the airframe surface, wherein the second pylon structure extends downstream of exits for the fan nozzle and the core nozzle.

12. The aircraft system of claim 11, wherein at least one of the fan nozzle and the core nozzle further comprises a plurality of projections formed at an exit perimeter thereof and extending in an aft direction, the projections being spaced apart from each other by a predetermined gap.

13. The aircraft system of claim 12, wherein a number of the projections on a side of the at least one of the fan nozzle and the core nozzle, adjacent to the first pylon structure are greater in size than a remainder of the plurality of the projections of the at least one of the fan nozzle and the core nozzle.

14. The aircraft system of claim 11, wherein the plurality of projections are circumferentially formed.

15. The aircraft system of claim 11, wherein the plurality of projections are azimuthally varied in size.

16. The aircraft system of claim 11, wherein the airframe surface comprises at least one of a wing, a tail, and a fuselage of the aircraft.

17. The aircraft system of claim 11, wherein the first pylon structure and the second pylon structure are formed at approximately 180 degrees apart.

18. The aircraft system of claim 11, wherein the first pylon structure is integrally formed with a lower surface of the core nozzle and extends downstream of exits of the fan nozzle and the core nozzle.

19. The aircraft system of claim 18, wherein the first pylon structure comprises a perforated surface including a plurality of apertures formed to flow air therethrough.

20. The aircraft system of claim 11, wherein the first pylon structure is integrally formed with a lower surface of the core nozzle and closes out before the exit of the core nozzle.

\* \* \* \* \*